(12) United States Patent
Diab et al.

(10) Patent No.: US 8,576,727 B2
(45) Date of Patent: Nov. 5, 2013

(54) SYSTEM AND METHOD FOR UNIQUE IDENTIFIER EXCHANGE DURING AUTO-NEGOTIATION

(75) Inventors: Wael William Diab, San Francisco, CA (US); Patricia A. Thaler, Carmichael, CA (US)

(73) Assignee: Broadcom Corporation, Irvine, CA (US)

(*) Notice: Subject to any disclaimer, the term of this patent is extended or adjusted under 35 U.S.C. 154(b) by 347 days.

(21) Appl. No.: 12/909,970

(22) Filed: Oct. 22, 2010

(65) Prior Publication Data

US 2011/0261720 A1  Oct. 27, 2011

Related U.S. Application Data

(60) Provisional application No. 61/327,327, filed on Apr. 23, 2010.

(51) Int. Cl.
*H04J 1/16* (2006.01)
*H04L 1/00* (2006.01)
*H04L 12/28* (2006.01)
*H04L 12/56* (2011.01)
*G06F 15/177* (2006.01)
*G06F 15/173* (2006.01)

(52) U.S. Cl.
USPC ........ 370/242; 370/254; 370/395.2; 709/220; 709/223

(58) Field of Classification Search
USPC ...................... 370/241–246, 254–255, 395.2; 709/220, 223
See application file for complete search history.

(56) References Cited

U.S. PATENT DOCUMENTS

| 2003/0165142 | A1 | 9/2003 | Mills et al. |
| 2005/0089051 | A1* | 4/2005 | Brooks ......................... 370/401 |
| 2007/0118748 | A1* | 5/2007 | Edney ............................ 713/171 |
| 2007/0121518 | A1 | 5/2007 | Arunachalam et al. |
| 2008/0101240 | A1* | 5/2008 | Rohilla et al. ................. 370/236 |
| 2008/0291922 | A1* | 11/2008 | Sultan et al. ............. 370/395.53 |
| 2011/0019689 | A1* | 1/2011 | Diab et al. .................... 370/462 |

FOREIGN PATENT DOCUMENTS

| EP | 1775884 | A2 | 4/2007 |
| GB | 2359222 | * | 1/2000 ............. H04L 12/56 |
| GB | 2359222 | A | 8/2001 |
| GB | 2372669 | A | 8/2002 |

OTHER PUBLICATIONS

EP Search Report, Aug. 2, 2011.

* cited by examiner

*Primary Examiner* — Un C Cho
*Assistant Examiner* — Jeremy Costin
(74) *Attorney, Agent, or Firm* — Duane S. Kobayashi

(57) ABSTRACT

A system and method for unique identifier exchange during auto-negotiation. Wired networks can include non-conformant bridges and/or repeaters that can erroneously forward link protocol frames such as LLDP. These present a problem for higher layer protocols that attempt to manage properties of the link. The unique identifiers exchanged during auto-negotiation can be passed up to higher layers for an integrity check of unique identifiers exchanged using higher layer protocols.

20 Claims, 5 Drawing Sheets

| 0-10 | 11 | 12 | 13 | 14 | 15 |
|---|---|---|---|---|---|
| Data Bits | Toggle | Ack2 | Message Page | Ack | Next Page |

FIG. 4

SYSTEM AND METHOD FOR UNIQUE IDENTIFIER EXCHANGE DURING AUTO-NEGOTIATION

This application claims priority to provisional application Ser. No. 61/327,327, filed Feb. 23, 2010, which is incorporated herein by reference in its entirety.

BACKGROUND

1. Field of the Invention

The present invention relates generally to network management and, more particularly, to system and method for unique identifier exchange during auto-negotiation.

2. Introduction

Network management, which relates to the operation, administration, maintenance, and provisioning of networked systems, is a key concern for IT administrators. Functions that are performed as part of network management can include controlling, planning, allocating, deploying, coordinating, and monitoring the resources of a network. Data for network management can be collected through various mechanisms, including agents installed on infrastructure.

One network management tool is the Link Layer Discovery Protocol (LLDP), which is a vendor-neutral Data Link Layer protocol used by network devices for advertising of their identity, capabilities, and interconnections on a IEEE 802 LAN network. Information gathered with LLDP is stored in the device as a management information database (MIB) and can be queried with the Simple Network Management Protocol (SNMP).

As these network management tools can be used to configure properties of a link, what is needed is a mechanism that ensures network management integrity when link protocol frames are unintentionally forwarded by a device.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which:

FIG. 4 illustrates an example of an unformatted page used in auto-negotiation.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

LLDP is a Layer 2 industry standard protocol (IEEE 802.1AB-2009) that allows a network device to advertise its identity and capabilities on the local network, thereby providing topology information. The standardization of LLDP enables the link-layer notification functions to occur between network devices from different vendors.

By its intended design, LLDP frames are not to be forwarded but are to be constrained to a single link. In some conventional networks, "leaky" bridges and/or undetected repeaters can cause an unintentional violation of such a constraint through the forwarding of an LLDP frame. Here, a "leaky" bridge can represent a poorly implemented bridge, whose forwarding of link protocol frames such as LLDP, can present a problem for higher layer protocols that are attempting to manage properties (e.g., change performance properties) of that particular link.

One of the reasons for the unintended forwarding of LLDP frames is the use of group addresses that create ambiguity in the destination field. In one example, these group addresses can be defined to determine the scope of propagation of LLDP frames within a bridged LAN. Of course, the rules restricting the propagation of LLDP frames is predicated on the network device's ability to function in a conforming manner. Non-conformant network devices can therefore create unintended configuration confusion in the network by erroneously forwarding LLDP frames.

Figure 1:
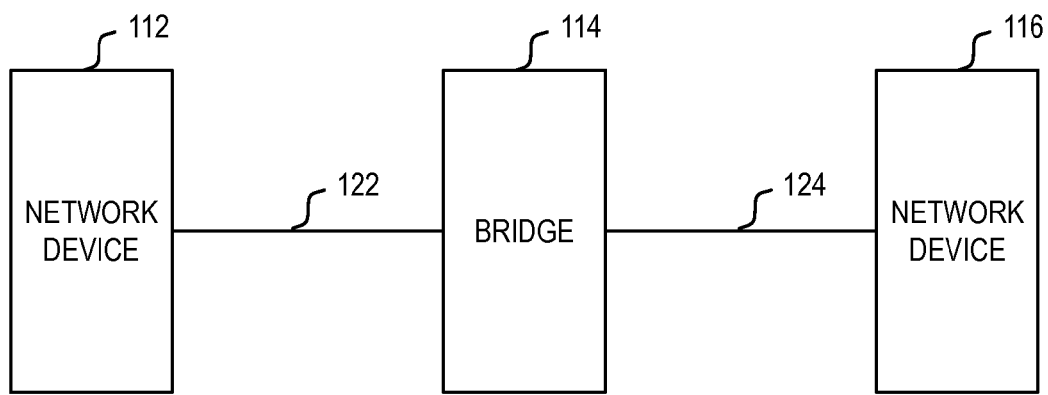
FIG. 1 illustrates an example of a network link.

FIG. 1 illustrates a simple example of a link having two link segments. As illustrated, the link between network devices 112 and 116 (e.g., switch, server, etc.) includes network bridge device 114. The inclusion of network bridge device 114 in the link between network devices 112 and 116 creates two link segments 122, 124. If network bridge device 114 is a "leaky" bridge, then LLDP frames forwarded by network bridge device 114 can cause network bridge device 114 to be undetected. A failure to properly detect network bridge device 114 can cause unintended configuration confusion.

Figure 2:
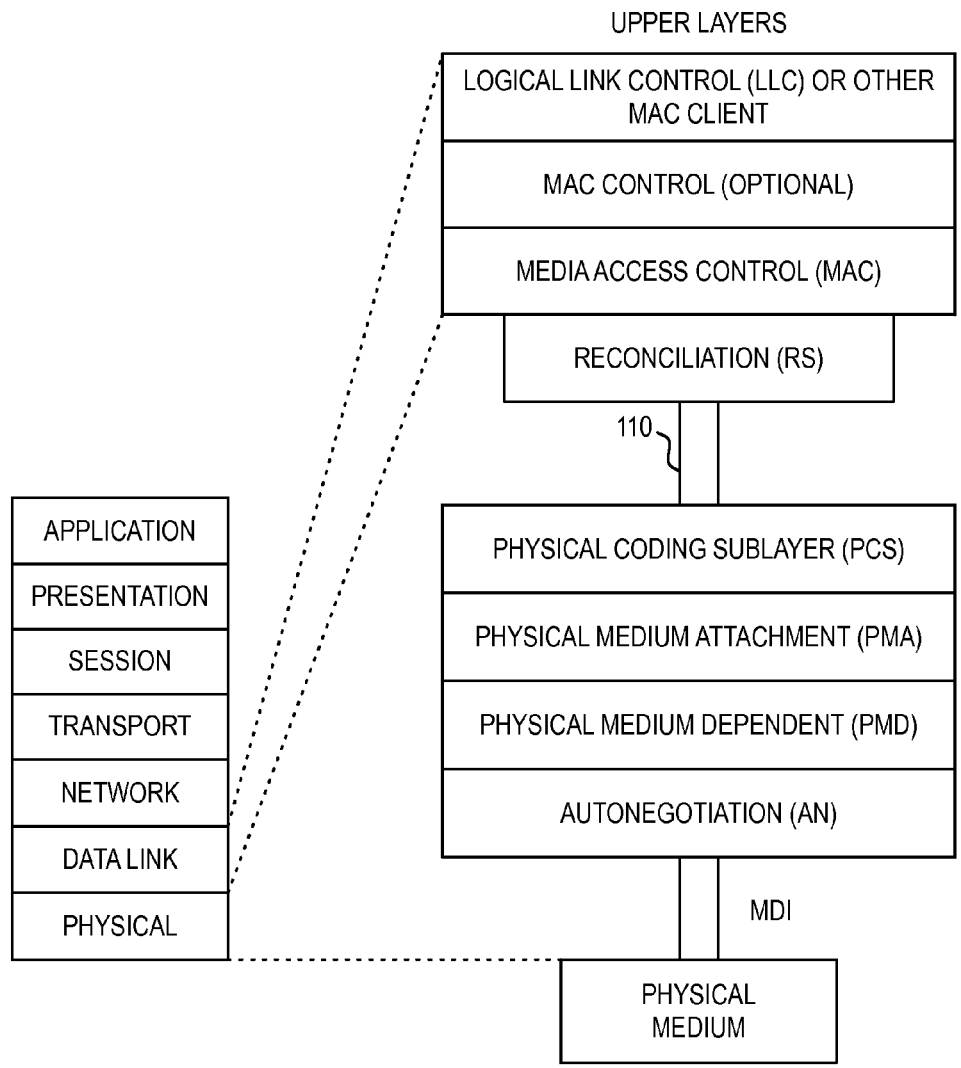
FIG. 2 illustrates an OSI layering diagram.

It is therefore a feature of the present invention that scenarios of unintentional forwarding of link protocol messages can be alleviated through a unique identifier exchange during auto-negotiation. As will be described in greater detail below, the unique identifier exchange during auto-negotiation provides a mechanism to determine whether invisible midpoint(s) exist. Prior to illustrating the features of the present invention, reference is first made to FIG. 2, which illustrates the ISO Open System Interconnection (OSI) reference model and its mapping to the IEEE 802.3 layering.

As illustrated, the physical layer (PHY) or Layer-1 includes a physical coding sublayer (PCS), a physical medium attachment (PMA), physical media dependent (PMD), and auto-negotiation (AN). The PHY interfaces with a particular physical medium (e.g., twisted pair cabling) over a medium dependent interface (MDI).

In general, auto-negotiation provides a linked device with the capability to detect the abilities (modes of operation) supported by the device at the other end of the link, determine common abilities, and configure for joint operation. Typically, the auto-negotiation process identifies the best possible mode of operation (or highest common denominator) that is shared by the two PHY devices. Here, a particular priority between different modes of operation can be defined, for example, where a higher speed is preferred over a lower speed, and a full duplex mode of operation is preferred over a half duplex mode of operation at the same speed. The result of the auto-negotiation process is for the communication parameters for the link to resolve to the highest performing common operating protocol that can be used on the link.

The auto-negotiation process is performed between Layer-1 PHYs. As such, the auto-negotiation process is performed between PHYs in each link segment. In the context of the simple link example of FIG. 1, a first auto-negotiation process is performed between a PHY in network device 112 and a PHY in network bridge device 114 for link segment 122, while a second auto-negotiation process is performed between a PHY in network bridge device 114 and a PHY in network device 116 for link segment 124.

Figure 3:
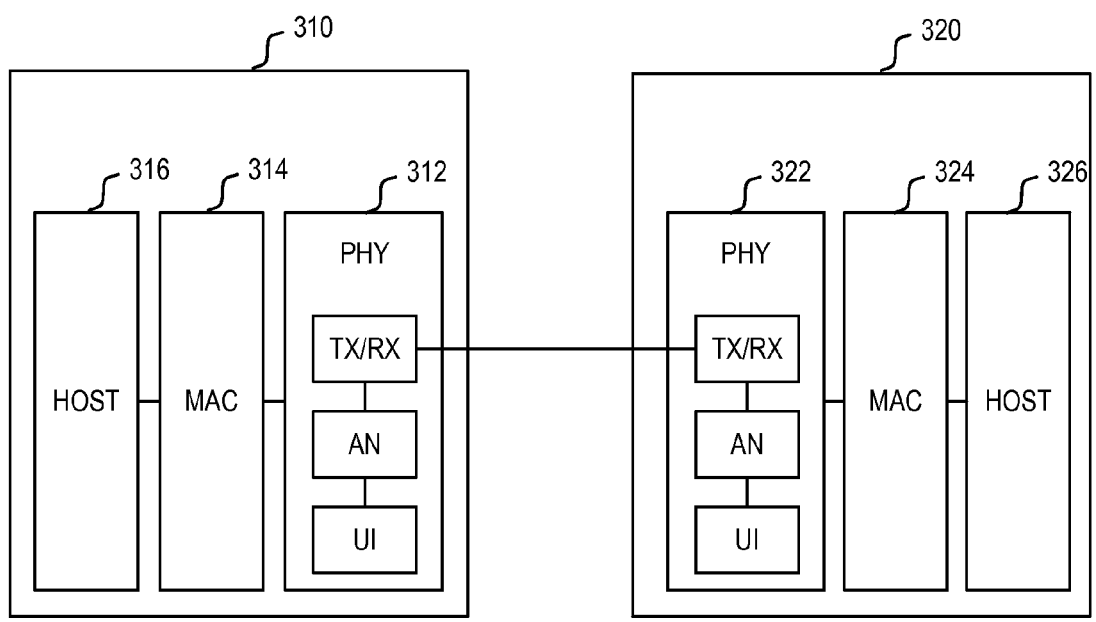
FIG. 3 illustrates the access of a unique identifier by the physical layer devices in an auto-negotiation process.

In the present invention, a unique identifier is exchanged during each auto-negotiation process, wherein each unique identifier is associated with a particular network device. FIG. 3 illustrates the access of a unique identifier by the PHYs in an auto-negotiation process. As illustrated, network devices 310, 320 include a PHY, MAC and host.

In general, host 316, 326 can comprise suitable logic, circuitry, and/or code that may enable operability and/or functionality of the five highest functional layers for data packets that are to be transmitted over the link. Since each layer in the OSI model provides a service to the immediately higher interfacing layer, MAC controller 314, 324 can provide the necessary services to host 316, 326 to ensure that packets are suitably formatted and communicated to PHY 312, 322. MAC controller 314, 324 can comprise suitable logic, circuitry, and/or code that may enable handling of data link layer (Layer-2) operability and/or functionality. MAC controller 314, 324 can be configured to implement Ethernet protocols, such as those based on the IEEE 802.3 standard, for example. PHY 312, 322 can be configured to handle physical layer requirements, which include, but are not limited to, packetization, data transfer and serialization/deserialization (SERDES).

As illustrated, PHY 312, 322 include transmitter/receiver (TX/RX) and auto-negotiation (AN) modules. The auto-negotiation modules within PHYs 312, 322 have access to a unique identifier (UI). In general, the unique identifier accessible to PHYs 312, 322 should have sufficient uniqueness so as to be distinguishable from other network devices. While a MAC address is sufficiently unique, usage of a MAC address as the unique identifier is not required. In one embodiment, the unique identifier can be limited to eight bits. For example, the four bits from the top of the MAC address can be extracted along with the four bits from the bottom of the MAC address. In another embodiment, the unique identifier can be based on random number generator. In yet another embodiment, the unique identifier can be based on a portion (or all) of the MAC address and a random number generator.

In various embodiments, the unique identifier can be self-assigned or assigned by to the network device by the manufacturer, client, IT personnel, etc. Here, it should be noted that the unique identifier can be generated by the PHY or made available to the PHY by any layer in the OSI hierarchy. For example, the unique identifier for each network device can be set by higher layer management such as SNMP. In one embodiment, the unique identifier can be made available to the PHY through storage of the unique identifier in a memory register accessible by the auto-negotiation module.

As noted above, a feature of the present invention is the exchange of unique identifiers by the PHYs during the Layer-1 auto-negotiation process. As the Layer-1 auto-negotiation process is performed in all link segments having bridges or repeaters, the exchange of unique identifiers by the PHYs assures that each network device knows the identity of the network device on the other end of the link segment.

In one embodiment, the unique identifiers are exchanged using auto-negotiation next page message(s). FIG. 4 illustrates an example format of an unformatted next page message. In the auto-negotiation process, one or more of these unformatted next page messages would be sent in addition to the predefined messages (e.g., base link code word) that are used in the identification of the standard modes of operation (e.g., 10/100/1000). By this process, an augmented auto-negotiation process would result, wherein the exchange of a unique identifier would alleviate concerns over the unintended forwarding of link protocol messages.

Here, it should be noted that while a MAC address is a unique identifier, the auto-negotiation next page message would not have enough bits to carry a full MAC address. Accordingly, exchange of a unique identifier that is separate from a MAC address would ensure greater compatibility with older PHY technologies. As noted above, any unique identifier, including a MAC address, can be used. The specific choice of such a unique identifier can be dependent on the specific mechanism used to create and/or exchange such a unique identifier.

Figure 5:
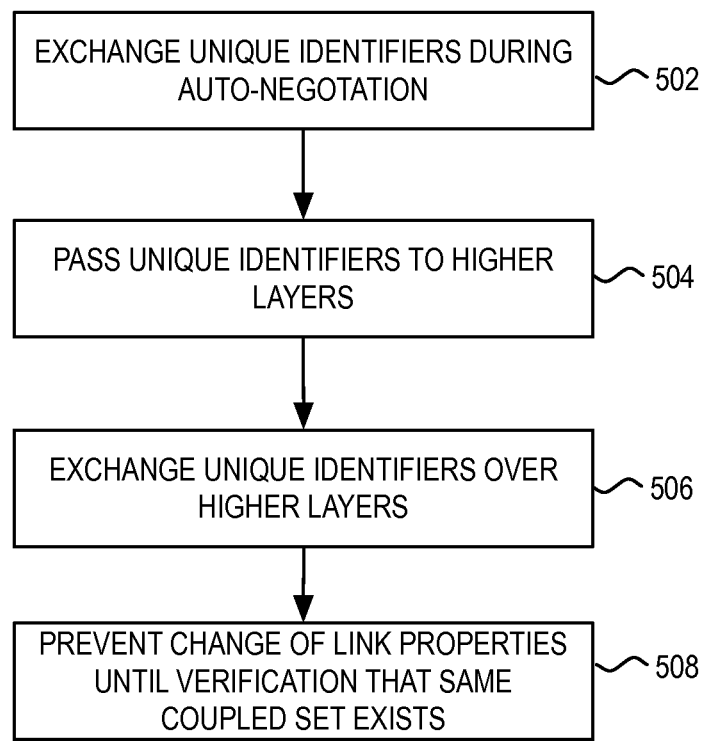
FIG. 5 illustrates a flowchart of a process of the present invention.

To illustrate the use of unique identifier exchange in the present invention, reference is now made to the flowchart of FIG. 5. As illustrated, the process begins at step 502, where unique identifiers are exchanged during auto-negotiation. As noted above, the specific form of the unique identifiers would be dependent on the particular creation and/or exchange mechanism.

Next, at step 504, the unique identifiers are passed from the PHYs to higher layers. As would be appreciated, the specific communication mechanism used to pass unique identifiers to the higher layers would be implementation dependent. Further, while the unique identifier received from a remote PHY would need to be passed to a higher layer, the unique identifier for the local PHY may not need to be passed to the higher layer. This results since the unique identifier for the local PHY may have originated in the higher layer instead of in the PHY.

As noted above, the exchange of unique identifiers during the auto-negotiation process enables each network device to determine the identity of the network device (e.g., bridge, repeater, etc.) on the other end of the link segment. The Layer-1 unique identifier exchange assures that no ambiguity of the identity of the network device on the other end of the link segment would exist. This is in contrast to the ambiguity that can be created when trying to ascertain the identity of a network device at the other end of a link segment based on higher layer protocol messages that can be erroneously forwarded. By passing the unique identifiers to the higher layers, the PHY provides the higher layers with a mechanism to confirm the identity of neighboring network devices that are ascertained based on higher layer protocol messages.

Now that the unique identifiers have been made available to the higher layers, at step 506, the unique identifiers can then be exchanged over the higher layer protocols. The exchange of the unique identifiers over the higher layer protocols can be used to determine whether or not the same coupled set of network devices exists. This verification that the same coupled set exists eliminates the possible existence of otherwise invisible midpoint(s) between a pair of neighboring devices. For example, if the unique identifier is a MAC address, then the MAC address included in an LLDP frame can be checked against the MAC address that is exchanged during auto-negotiation.

Finally, at step 508, changes to the link properties are prevented until the verification that the same coupled set exists is completed. In one embodiment, an alert can be generated when it is determined that a comparison of the unique identifier received during the Layer-1 auto-negotiation process is different than the unique identifier received in a higher layer protocol message. Here, a failure in such a comparison would indicate that the higher layer protocol message was not generated by a neighboring device, but was forwarded by an apparent undetected bridge or repeater.

It should be noted that the principles of the present invention can be applied to various higher layer communication protocols. Any communication protocol that can exchange a unique identifier can be used.

As would be appreciated, the principles of the present invention can be used with various port types (e.g., backplane, twisted pair, optical, etc.) as well as standard or non-standard (e.g., 2.5G, 5G, 10G, etc.) link rates, as well as future link rates (e.g., 40G, 100G, etc.).

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A method in a first network device that enables network management of a link between said first network device and a second network device, said first network device coupled to said second network device via a network cable, comprising:
    accessing a first unique identifier that is generated for use by an auto-negotiation module in a first Open System Interconnection (OSI) Layer 1 physical layer device in said first network device;
    transmitting, by said first OSI Layer 1 physical layer device, said first unique identifier to a second OSI Layer 1 physical layer device in said second network device using a first next page message, said transmitting occurring during an auto-negotiation process that chooses common transmission parameters between said first OSI Layer 1 physical layer device and said second OSI Layer 1 physical layer device;
    receiving, by said first OSI Layer 1 physical layer device during said auto-negotiation process, a second unique identifier from said second OSI Layer 1 physical layer device in a second next page message;
    receiving a protocol message at an OSI layer higher than OSI Layer 1 in said first network device via said network cable, said protocol message including a third unique identifier;
    comparing said second unique identifier to said third unique identifier; and
    generating an alert if said comparison indicates that said second unique identifier is different than said third unique identifier, said generated alert preventing at least one property of said link from being changed.

2. The method of claim 1, wherein said protocol message is a link layer discovery protocol message.

3. The method of claim 1, wherein said first unique identifier is a media access control address.

4. The method of claim 1, wherein said first unique identifier is generated at least in part by a random number generator.

5. The method of claim 1, wherein said first unique identifier is determined at least in part by a higher layer protocol above an OSI Layer 1 physical layer.

6. The method of claim 5, wherein said first unique identifier is made available to said first OSI layer 1 physical layer device by a higher OSI layer device in said first network device.

7. A method in a first network device that enables network management of a link between said first network device and a second network device, said first network device coupled to said second network device via a network cable, comprising:
    during a physical layer auto-negotiation process wherein a first Open System Interconnection (OSI) Layer 1 physical layer device in said first network device chooses common transmission parameters with a second (OSI) Layer 1 physical layer device in said second network device, exchanging first unique identifiers between said first (OSI) Layer 1 physical layer device and said second (OSI) Layer 1 physical layer device;
    exchanging second unique identifiers using protocol messaging at an (OSI) layer higher than (OSI) Layer 1 over said network cable;
    determining whether one of said first unique identifiers and one of said second unique identifiers indicate that said exchange of first unique identifiers and said exchange of second unique identifiers occurred between the same set of network devices; and
    generating an alert if said determination indicates that said first unique identifiers and said second unique identifiers indicate that said exchange of first unique identifiers and said exchange of second unique identifiers occurred between a different set of network devices, said generated alert preventing at least one property of said link from being changed.

8. The method of claim 7, wherein said exchange of first unique identifiers uses auto-negotiation next page messages.

9. The method of claim 7, wherein said exchange of second unique identifiers uses link layer discovery protocol message.

10. The method of claim 7, wherein said first unique identifiers are media access control addresses.

11. The method of claim 7, wherein said first unique identifiers are generated at least in part by random number generators.

12. The method of claim 7, wherein said first unique identifiers are determined at least in part by a higher layer protocol above an OSI Layer 1 physical layer.

13. The method of claim 12, wherein said first unique identifiers is made available to said first (OSI) Layer 1 physical layer devices prior to said exchange by a higher OSI layer device in said first network device.

14. A first network device that enables network management of a link between said first network device and a second network device, said first network device coupled to said second network device via a network cable, comprising:
    a first Open System Interconnection (OSI) Layer 1 physical layer device, said first (OSI) Layer 1 physical layer device including an auto-negotiation module that enables said first (OSI) Layer 1 physical layer device to establish common transmission parameters with a second (OSI) Layer 1 physical layer device in said second network device, said auto-negotiation module having access to a first unique identifier, which is transmitted to said second (OSI) Layer 1 physical layer device during an auto-negotiation process, said auto-negotiation module also receiving during said auto-negotiation process, a second unique identifier from said second (OSI) Layer 1 physical layer device; and
    a controller that compares said second unique identifier with a third unique identifier included in a protocol message at an (OSI) layer higher than Layer 1 that is received via said network cable, said controller generating an alert if said comparison indicates that said second unique identifier is different than said third unique identifier, said generated alert preventing at least one property of said link from being changed.

15. The first network device of claim 14, wherein said auto-negotiation module transmits said first unique identifier using an auto-negotiation next page message.

16. The first network device of claim 14, wherein said third unique identifier is received in a link layer discovery protocol message.

17. The first network device of claim 14, wherein said first unique identifier is a media access control address.

18. The first network device of claim 14, wherein said first unique identifier is generated at least in part by a random number generator.

19. The first network device of claim 14, wherein said first unique identifier is determined at least in part by a higher layer protocol above an (OSI) Layer 1 physical layer.

20. The first network device of claim 19, wherein said first unique identifier is made available to said first (OSI) Layer 1 physical layer device by higher OSI layer device in said first network device.

\* \* \* \* \*